United States Patent
Ranganath et al.

(10) Patent No.: US 8,717,400 B2
(45) Date of Patent: May 6, 2014

(54) AUTOMATICALLY MOVING A CONFERENCING BASED ON PROXIMITY OF A PARTICIPANT

(75) Inventors: Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 331 days.

(21) Appl. No.: 13/194,709

(22) Filed: Jul. 29, 2011

(65) Prior Publication Data

US 2013/0027505 A1    Jan. 31, 2013

(51) Int. Cl.
*H04N 7/14* (2006.01)

(52) U.S. Cl.
USPC ..................... 348/14.01; 455/416

(58) Field of Classification Search
USPC ........................... 348/14.01–14.08
See application file for complete search history.

(56) References Cited

U.S. PATENT DOCUMENTS

| | | | |
|---|---|---|---|
| 4,737,863 A | 4/1988 | Eto et al. |
| 4,855,843 A | 8/1989 | Ive |
| 5,812,865 A | 9/1998 | Theimer et al. |
| 6,095,420 A | 8/2000 | Kawai et al. |
| 6,163,692 A * | 12/2000 | Chakrabarti et al. | 455/416 |
| 6,275,575 B1 | 8/2001 | Wu |
| 6,359,902 B1 | 3/2002 | Putzolu |
| 6,414,635 B1 | 7/2002 | Stewart et al. |
| 6,448,978 B1 | 9/2002 | Salvador et al. |
| 6,498,955 B1 | 12/2002 | McCarthy et al. |
| 6,587,456 B1 | 7/2003 | Rao et al. |
| 6,741,608 B1 | 5/2004 | Bouis et al. |
| 6,798,753 B1 | 9/2004 | Doganata et al. |
| 6,870,916 B2 | 3/2005 | Henrikson et al. |
| 6,968,179 B1 | 11/2005 | DeVries |
| 7,062,567 B2 | 6/2006 | Benitez et al. |
| 7,092,002 B2 | 8/2006 | Ferren et al. |
| 7,133,922 B1 | 11/2006 | She et al. |
| 7,242,421 B2 | 7/2007 | Center et al. |
| 7,292,845 B2 | 11/2007 | Flannery |
| 7,312,809 B2 | 12/2007 | Bain et al. |
| 7,362,776 B2 | 4/2008 | Meier et al. |
| 7,522,181 B2 | 4/2009 | Wilson |
| 7,532,231 B2 | 5/2009 | Pepperell et al. |
| 7,602,893 B2 | 10/2009 | Bhatia et al. |
| 7,664,109 B2 | 2/2010 | Li |

(Continued)

OTHER PUBLICATIONS

U.S. Appl. No. 13/191,189, filed Jul. 26, 2011, inventors Ranganath et al.

(Continued)

*Primary Examiner* — Maria El-Zoobi
(74) *Attorney, Agent, or Firm* — Meyertons Hood Kivlin Kowert & Goetzel, P.C.; Jeffrey C. Hood; Joel L. Stevens

(57) ABSTRACT

Customizing a conferencing system based on proximity of a participant. A first participant may be detected as being proximate to a first conferencing system. For example, the first participant may provide user input to check in to the first conferencing system. Alternatively, the conferencing system may automatically detect the first participant (e.g., by automatically detecting a personal device of the first participant). In response to detecting the proximate participant, the first conferencing system may be automatically customized for the participant.

20 Claims, 5 Drawing Sheets

(56) References Cited

U.S. PATENT DOCUMENTS

| | | | |
|---|---|---|---|
| 7,692,683 B2 | 4/2010 | Kenoyer et al. | |
| 7,770,115 B2 | 8/2010 | Gallmeier et al. | |
| 7,788,380 B2 | 8/2010 | Shim et al. | |
| 7,835,378 B2 | 11/2010 | Wijnands et al. | |
| 7,881,233 B2 | 2/2011 | Bieselin | |
| 7,936,872 B2 | 5/2011 | Krumm et al. | |
| 7,945,573 B1 | 5/2011 | Barnes et al. | |
| 7,986,637 B2 | 7/2011 | Panwar et al. | |
| 7,986,665 B2 * | 7/2011 | Kezys et al. | 370/331 |
| 8,050,917 B2 | 11/2011 | Caspi et al. | |
| 8,103,750 B2 | 1/2012 | O'Neal et al. | |
| 8,116,612 B2 | 2/2012 | Vasilevsky et al. | |
| 8,125,509 B2 | 2/2012 | Kenoyer | |
| 8,127,043 B2 | 2/2012 | Vecchio et al. | |
| 8,139,100 B2 | 3/2012 | King et al. | |
| 8,218,753 B2 | 7/2012 | Khouri et al. | |
| 8,237,765 B2 | 8/2012 | King et al. | |
| 8,265,240 B2 | 9/2012 | Langgood et al. | |
| 8,270,320 B2 | 9/2012 | Boyer et al. | |
| 8,319,814 B2 | 11/2012 | King et al. | |
| 8,326,276 B2 | 12/2012 | Chin | |
| 8,358,763 B2 | 1/2013 | Patel et al. | |
| 8,487,758 B2 * | 7/2013 | Istoc | 340/539.15 |
| 2003/0044654 A1 | 3/2003 | Holt | |
| 2004/0001446 A1 | 1/2004 | Bhatia et al. | |
| 2004/0141606 A1 | 7/2004 | Torvinen | |
| 2004/0199580 A1 | 10/2004 | Zhakov et al. | |
| 2004/0207724 A1 | 10/2004 | Crouch et al. | |
| 2005/0144318 A1 * | 6/2005 | Chang | 709/245 |
| 2006/0045030 A1 | 3/2006 | Bieselin | |
| 2006/0067250 A1 | 3/2006 | Boyer et al. | |
| 2006/0087553 A1 | 4/2006 | Kenoyer et al. | |
| 2006/0215585 A1 | 9/2006 | Taniwaki | |
| 2007/0036317 A1 * | 2/2007 | Shaffer et al. | 379/202.01 |
| 2007/0081651 A1 | 4/2007 | Iyer et al. | |
| 2007/0188598 A1 | 8/2007 | Kenoyer | |
| 2007/0264989 A1 | 11/2007 | Palakkal et al. | |
| 2007/0285502 A1 | 12/2007 | Yee | |
| 2007/0285504 A1 | 12/2007 | Hesse | |
| 2008/0063174 A1 | 3/2008 | Patel et al. | |
| 2008/0292074 A1 | 11/2008 | Boni et al. | |
| 2008/0294724 A1 | 11/2008 | Strong | |
| 2008/0316295 A1 | 12/2008 | King et al. | |
| 2008/0316297 A1 | 12/2008 | King et al. | |
| 2008/0316298 A1 | 12/2008 | King et al. | |
| 2009/0108057 A1 | 4/2009 | Mu et al. | |
| 2009/0123035 A1 | 5/2009 | Khouri et al. | |
| 2009/0257576 A1 * | 10/2009 | Wellard et al. | 379/201.03 |
| 2010/0155464 A1 | 6/2010 | Swayn et al. | |
| 2010/0188473 A1 | 7/2010 | King et al. | |
| 2010/0225736 A1 | 9/2010 | King et al. | |
| 2010/0226288 A1 | 9/2010 | Scott et al. | |
| 2010/0226487 A1 * | 9/2010 | Harder et al. | 379/202.01 |
| 2010/0315483 A1 | 12/2010 | King | |
| 2011/0085732 A1 | 4/2011 | Cheng | |
| 2011/0149628 A1 | 6/2011 | Langtry et al. | |
| 2011/0234746 A1 * | 9/2011 | Saleh et al. | 348/14.03 |
| 2011/0251949 A1 | 10/2011 | Kay et al. | |
| 2011/0254912 A1 | 10/2011 | Mock et al. | |
| 2011/0261147 A1 | 10/2011 | Goyal et al. | |
| 2011/0261148 A1 | 10/2011 | Goyal et al. | |
| 2011/0279631 A1 * | 11/2011 | Ranganath et al. | 348/14.08 |
| 2011/0290882 A1 | 12/2011 | Gu et al. | |
| 2012/0185291 A1 * | 7/2012 | Ramaswamy et al. | 705/7.19 |
| 2012/0274731 A1 | 11/2012 | Shanmukhadas et al. | |
| 2012/0293599 A1 | 11/2012 | Norlin et al. | |
| 2012/0300678 A1 * | 11/2012 | Kezys et al. | 370/261 |
| 2012/0311038 A1 * | 12/2012 | Trinh et al. | 709/204 |

OTHER PUBLICATIONS

U.S. Appl. No. 13/171,292, filed Jun. 28, 2011, inventor Wayne E. Mock.

U.S. Appl. No. 13/327,904, filed Dec. 16, 2011, inventor Wayne E. Mock.

* cited by examiner

_US 8,717,400 B2_

AUTOMATICALLY MOVING A CONFERENCING BASED ON PROXIMITY OF A PARTICIPANT

FIELD OF THE INVENTION

The present invention relates generally to conferencing and, more specifically, to automatically customizing a conferencing system based on proximity of a participant.

DESCRIPTION OF THE RELATED ART

Conferencing may be used to allow two or more participants at remote locations to communicate using audio. Additionally, Videoconferencing may be used to allow such participants to communicate using both video and audio. Each participant location may include a conferencing system for audio and/or video communication with other participants. Some of the conferencing systems may be customized by participants, e.g., where the conferencing system has a participant's desired conferencing settings, contact list, etc. However, the participant's custom settings are localized only to those conferencing systems that the participant has manually configured. Accordingly, improvements in conferencing are desired.

SUMMARY OF THE INVENTION

Various embodiments are presented of a system and method for customizing a conferencing system based on proximity of a participant.

Initially, the method may detect that a participant is in proximity to a conferencing system. According to various embodiments, the conferencing system may be an audio conferencing system or a videoconferencing system. Additionally, the detection may be performed manually or automatically, as desired. For example, the participant may provide user input to "check in" to the conferencing system, e.g., by entering a personal identification number of the participant, logging in to the conferencing system, etc. Alternatively, the conferencing system (or some device associated with the conferencing system) may be configured to automatically detect the participant, without receiving user input identifying the participant. For example, the conferencing system may be configured to detect a personal device (e.g., mobile communication device such as a cell phone or smart phone, or other types of devices, such as personal digital assistants (PDAs), netbooks, tablets, laptops, etc.) of the participant. In some embodiments, the personal device may be detected via a short range communication protocol, e.g., via 802.11x, Bluetooth, near field communication (NFC) protocols, etc. As another example, the conferencing system may detect a geographic position of the personal device (e.g., which may report that geographic position, such as GPS coordinates, to a server) and compare the position to its own, known position. Thus, the method may detect that a participant is proximate to the conferencing system.

Based on the detection that the participant is in proximity to the conferencing system, the method may automatically customize the conferencing system. Customizing the conferencing system may include loading content associated with the first participant. In some embodiments, the content may already be stored on the conferencing system or it may be automatically downloaded from a server (e.g., over a local area network (LAN) or wide area network (WAN), such as the Internet). Once downloaded, the content may be loaded onto the conferencing system so as to customize the conferencing system for the participant. The content may be any of various settings or other information that is already associated with the participant. For example, the content may include a contact list associated with the first participant. Thus, even though the participant may be at a new conferencing system, his contact list may be loaded and available at the new conferencing system based on the automatic customization. Similarly, other content may be loaded, such as recording settings, camera settings, conferencing layout settings (e.g., for videoconferences), presentation settings, background images, menu layouts, etc. Further, a conference schedule associated with the participant may be loaded.

In one embodiment, the participant may have a scheduled conference call that is associated with a different conferencing system. However, in response to detecting that the participant is proximate to the conferencing system above, the conferencing system may automatically associate the upcoming conference with the new conferencing system. Accordingly, the participant may use the new conferencing system for the conference even though it was originally scheduled with a different conferencing system. Further, the method may automatically release or free the original conferencing system since it is now being performed by the new conferencing system.

Additionally, where multiple participants are detected in proximity to the conferencing room, the method may perform various actions. For example, in one embodiment, the customization may occur for the participant that arrived soonest, for a participant having highest priority or seniority, or via other automatic selections. Alternatively, or additionally, the customization may occur for the participant that manually checks in (e.g., via the methods described above, among others). For example, in response to detecting the multiple participants, the conferencing system may display a log in or check in screen for one of the participants to check in, rather than automatically selecting one of the participants.

BRIEF DESCRIPTION OF THE DRAWINGS

A better understanding of the present invention may be obtained when the following detailed description is considered in conjunction with the following drawings, in which.

Figure 1:
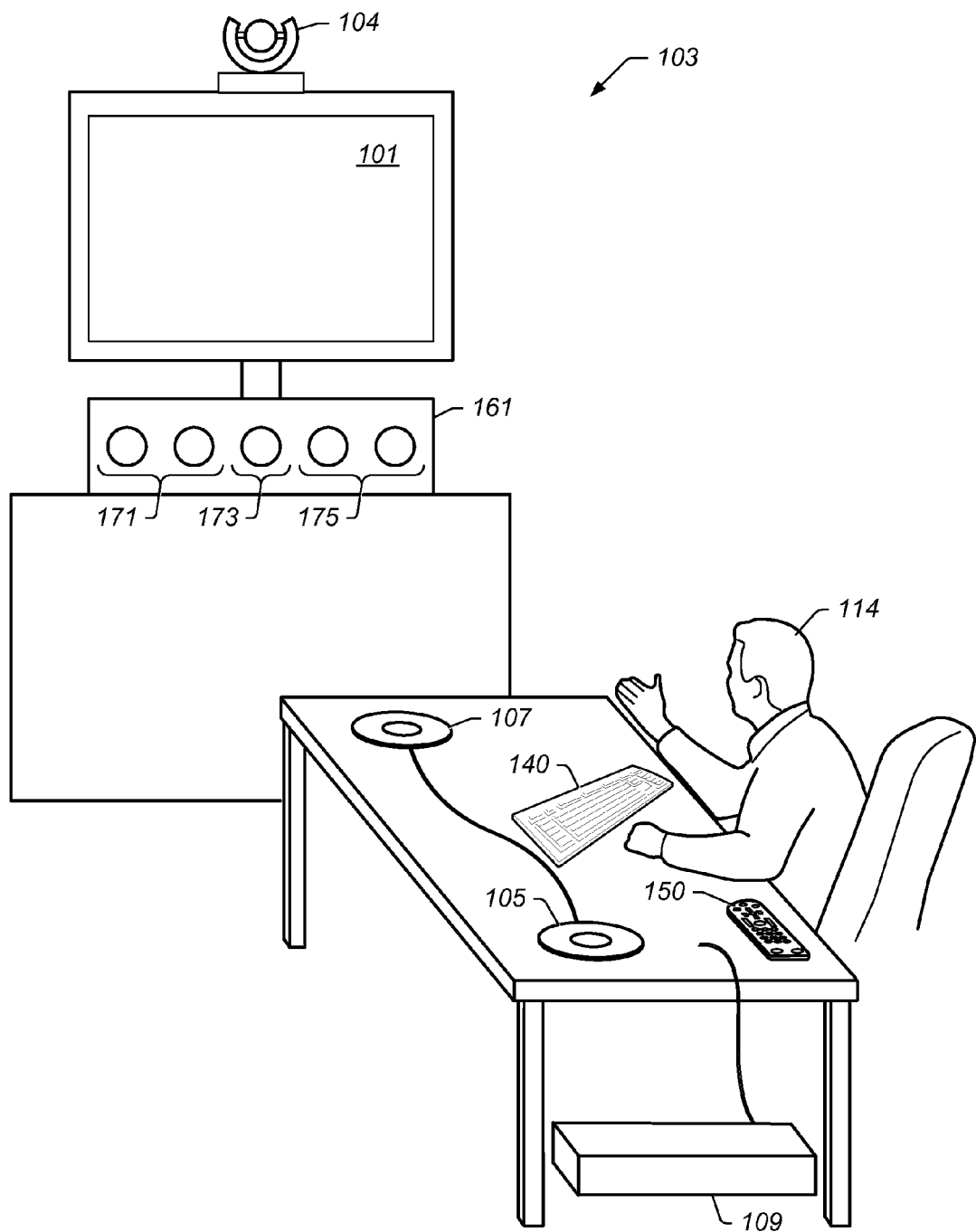
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. Patent Application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. Patent Application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. Patent Application titled "Conferencing System Utilizing a Mobile Communication Device as an Interface", serial number 12/692,915, whose inventors are Keith C. King and Matthew K. Brandt, is hereby incorporated by reference in its entirety as though fully and completely set forth herein.

U.S. patent application Ser. No. 13/093,948, titled "Recording a Videoconference Based on Recording Configurations", filed Apr. 26, 2011, whose inventors are Ashish Goyal and Binu Kaiparambil Shanmukhadas.

U.S. patent application Ser. No. 12/724,226, titled "Automatic Conferencing Based on Participant Presence", filed on Mar. 15, 2010, whose inventor is Keith C. King, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the participant may desire to call to conduct a videoconference.

Note that the videoconferencing system shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
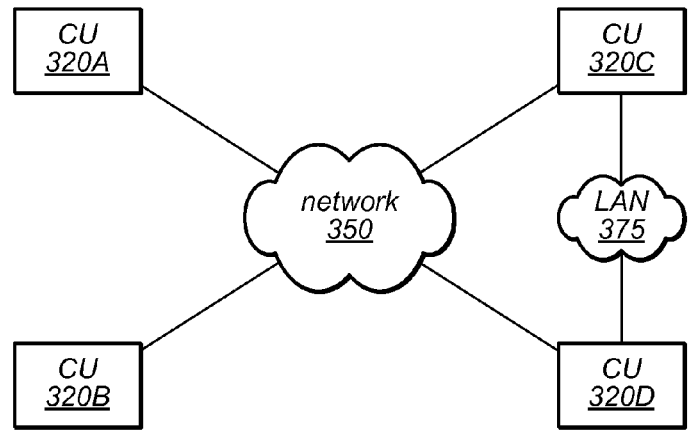
FIGS. 3A and 3B illustrate exemplary conferencing systems coupled in different configurations, according to some embodiments.
Figure 3B:
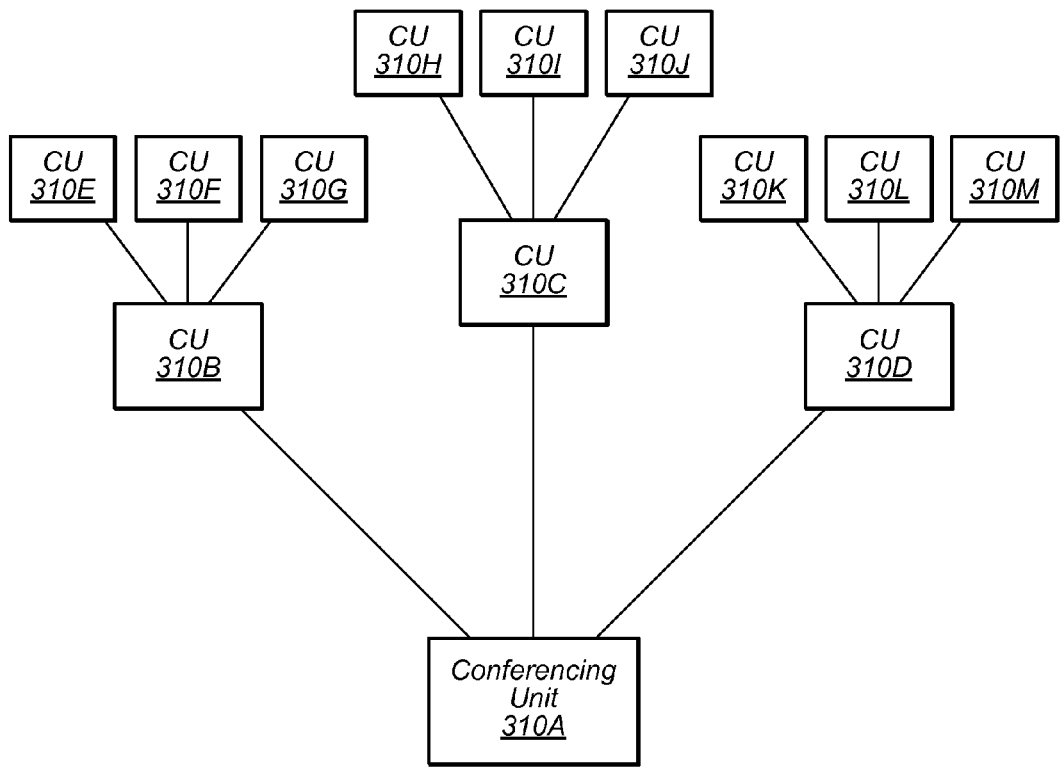

FIGS. 3A and 3B—Coupled Conferencing systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
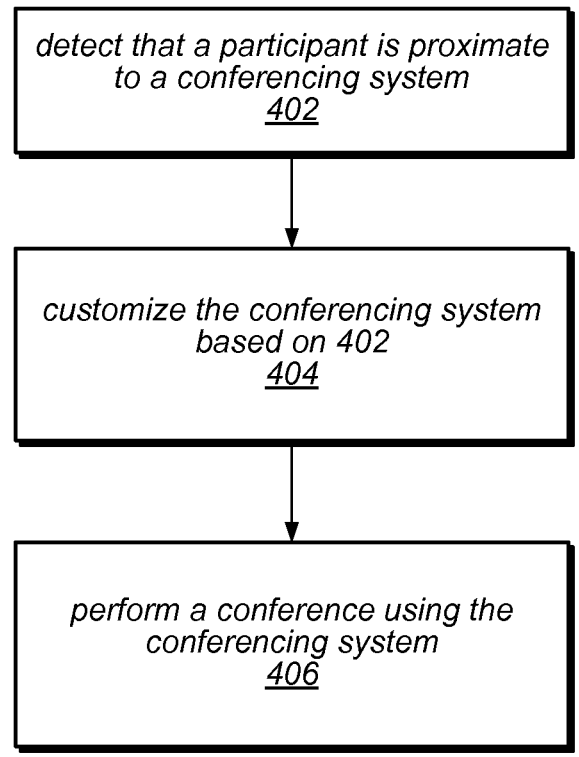
FIG. 4 is a flowchart diagram illustrating an embodiment of a method for customizing a conference based on proximity of a participant.

FIG. 4—Customizing a Conferencing System Based on Proximity of a Participant FIG. 4 illustrates a method for customizing a conference based on proximity of a participant. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, the method may detect that a participant is in proximity to a conferencing system. As used herein "in proximity to" or general descriptions related to a participant being "proximate to" a conferencing system refers to a participant that is close enough in distance to participate in a conference using the conferencing system. Generally, a conferencing system may be within a conference room, so a participant being proximate to such a conferencing system may simply refer to the participant being within the same conference room as the conferencing system. However, where a room is very large, a participant may need to be closer to the conferencing system than simply being within the same room to be considered "proximate to" the conferencing system.

The detection that the participant is proximate to the conferencing system may be performed manually or automatically, as desired. For example, the participant may manually provide user input to "check in" to the conferencing system. The user input may be provided in a variety of ways. For example, the conferencing system may include a log in screen and the participant may provide a user name and password in order to check in to the conferencing system. As another example, the participant may provide a personal identification number (PIN) that is associated with the participant to the conferencing system, e.g., via a remote. As another example, the participant may be able to provide audible commands to the conferencing system in order to check in, such as by speaking the participants name, providing a log in phrase, etc. In further embodiments, the participant may be able to provide a visual gesture in order to check in to the conferencing system. For example, the participant may provide a gesture that is unique to the participant. Thus, in some embodiments, the unique detection or determination of the participant may be performed by the participant manually providing unique identification information.

Alternatively, or additionally, the detection of the participant may be performed automatically. More specifically, the conferencing system (or some device associated with the conferencing system) may be configured to automatically detect the participant, without receiving user input identifying the participant. For example, the conferencing system may be configured to detect a personal device (e.g., mobile communication device such as a cell phone or smart phone, or other types of devices, such as personal digital assistants (PDAs), netbooks, tablets, laptops, etc.) of the participant. In some embodiments, the personal device may be detected via a short range communication protocol, e.g., via 802.11x, Bluetooth, near field communication (NFC) protocols, etc. Thus, the conferencing system may detect the presence of the personal device, e.g., via a short range protocol, and then determine the participant associated with the personal device. In one embodiment, the conferencing system may store or be able to access (e.g., on a remote server) associations between personal devices and participants. For example, a MAC address of the personal device may be associated with the participant in a database, e.g., stored on a server that is accessible by the conferencing system. Alternatively, the personal device may be configured to provide identification information of the participant during communication. In another embodiment, the conferencing system may detect a geographic position of the personal device (e.g., which may report that geographic position, such as GPS coordinates, to a server) and compare the position to its own, known position. The geographic position may be determined via GPS, WiFi triangulation, cell tower triangulation, and/or any method for determining the position of the personal device. Accordingly, when the two positions are within a threshold, the conferencing system may detect that the participant is proximate to the conferencing system. One or more can also be run just to increase accuracy of identifying the participant.

In further embodiments, the conferencing system may be configured to automatically detect the participant via image recognition, such as face recognition. Additionally, or alternatively, the conferencing system may be configured to automatically detect the participant via voice recognition, e.g., automatically identifying the participant when the participant speaks. For example, the image or voice recognition may be performed whenever the participant speaks or is within visible range of the conferencing system. Alternatively, the recognition may be performed in response to user input, e.g., when using a phrase for checking in, such as "check in" or "log me in" and/or when using a visual gesture for checking in, such as waving at the conferencing system.

Further manual and automatic methods for detecting the participant are envisioned. Thus, the method may detect that a participant is proximate to the conferencing system.

In 404, based on the detection that the participant is in proximity to the conferencing system, the method may automatically customize the conferencing system. Customizing the conferencing system may include loading content associated with the first participant. In some embodiments, the content may already be stored on the conferencing system or it may be automatically downloaded from a server (e.g., over a local area network (LAN) or wide area network (WAN), such as the Internet). Accordingly, the content may be loaded onto the conferencing system so as to customize the conferencing system for the participant. The content may be any of various settings or other information that is already associated with the participant. For example, the content may include a contact list associated with the first participant. Thus, even though the participant may be at a new conferencing system, his contact list may be loaded and available at the new conferencing system based on the automatic customization. Similarly, other content may be loaded, such as system or room identification settings (e.g., to rename the system to indicate the presence of or customization for the participant), lighting settings, recording settings, camera settings or presets, conferencing layout settings (e.g., for videoconferences), presentation settings, background images, menu layouts, etc.

Further, a conference schedule associated with the participant may be loaded. For example, the participant may be able to select an upcoming conference and initiate the conference using the schedule. Additionally, some of the customizations described above may also be based on an upcoming conference. For example, if the upcoming conference is for a single person in the conferencing room, the camera settings or presets may be customized for having a single person. Similarly, the loaded layout settings may be customized based on the expected number of participants or other endpoints in an upcoming conference.

Accordingly, in one embodiment, the conferencing system may be customized based on the proximity of the participant to effectively convert the conferencing system into a personal conferencing system of the participant. In a further embodiment, the method may also broadcast presence status to all interested users or participants about the participant's presence in the meeting room (or proximity to the conferencing system).

In 406, a conference may be initiated or performed between a plurality of participants at respective participant locations. More specifically, the conference may be initiated between the participant using the conferencing system (e.g., an endpoint at a first participant location) and a plurality of other participants using other conferencing systems (e.g., at other participant locations). The conference may be established according to any of a variety of methods, e.g., the one described in patent application Ser. No 11/252,238, which was incorporated by reference above. The conference may utilize an instant messaging service or conferencing service over the Internet, as desired. In some embodiments, a multipoint control unit (MCU) may perform or control the conference between the plurality of conferencing systems. For example, in a videoconference, one of the conferencing systems may act as the MCU and may perform decoding and encoding operations on video information transmitted in the first videoconference between the plurality of videoconferencing endpoints. In some embodiments, the conference may be initiated automatically, as described in U.S. patent application Ser. No. 12/724,226, which was incorporated by reference above.

Figure 5:
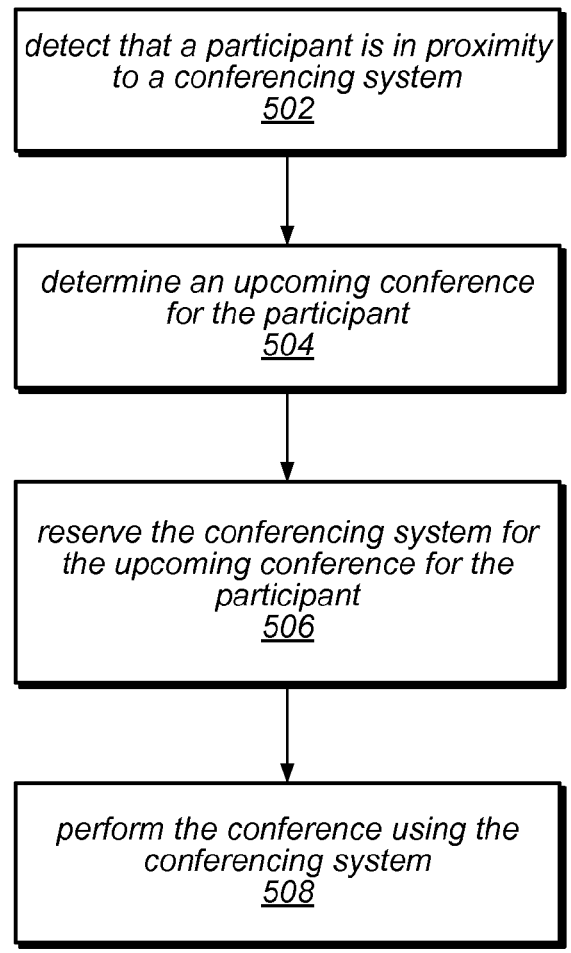
FIG. 5 is a flowchart diagram illustrating an embodiment of a method for automatically using a first conferencing system instead of a second conferencing system based on proximity of a participant.

FIG. 5—Using a New Conferencing System Based on Proximity of a Participant

FIG. 5 illustrates a method for automatically using a first conferencing system instead of a second conferencing system based on proximity of a participant. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, the method may detect that a participant is in proximity to a conferencing system similar to 402 above. Additionally, the conferencing system may be customized in the manner described above.

In 504, an upcoming conference for the participant may be determined. For example, the conferencing system may determine a schedule of conferences associated with the participant, e.g., via communication with a server that stores the participant's schedule. For example, conferences associated with the participant may include any conferences the participant has organized or agreed to join. Such scheduling may be performed in any number of ways, e.g., via appointments within email clients, scheduling programs associated with conferencing, via websites, etc. In one embodiment, the conferencing system may send a request to the server to determine if there is an upcoming conference within a threshold of time of the current time. Alternatively, the conferencing server may download the schedule and automatically perform the time comparison. In various embodiments, the threshold of time may be 5 minutes, 10 minutes, 15 minutes, 30 minutes, etc.

In 506, the conferencing system may be associated with or reserved for the upcoming conference for the participant. For example, the upcoming conference may have been previously associated with a different conferencing system. However, in response to the participant being proximate to the conferencing system within the threshold of time, the conferencing system may be used for the conference instead of the previously reserved conferencing system. In some embodiments, the method may automatically unassociate the previous conferencing system with the conference so that it may be used for other conferences. For example, the conferencing system may provide a message to release the second conferencing system from the scheduled conference. Alternatively, this release may be performed automatically by a server managing the conferencing systems in response to the association of the conferencing system with the upcoming conference in 506.

Thus, in one embodiment, the participant may have a scheduled conference call that is associated with a different conferencing system. However, in response to detecting that the participant is proximate to the conferencing system above, the conferencing system may automatically associate the upcoming conference with the new conferencing system. Accordingly, the participant may use the new conferencing system for the conference even though it was originally scheduled with a different conferencing system. Further, the method may automatically release or free the original conferencing system since it is now being performed by the new conferencing system.

In 508, the conference may be performed using the conferencing system, similar to 406 above. Also similar to above, In some embodiments, the conference may be initiated automatically, as described in U.S. patent application Ser. No. 12/724,226, which was incorporated by reference above.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory, computer accessible memory medium storing program instructions for automatically using a first conferencing system instead of a second conferencing system, wherein the program instructions are executable to:
   detect a first participant is in proximity to the first conferencing system;
   determine that a conference is scheduled for the first participant using the second conferencing system; and
   automatically use the first conferencing system instead of the second conferencing system for the conference based on detecting the first participant is in proximity to the first conferencing system and based on determining that the conference is scheduled for the first participant.

2. The non-transitory, computer accessible memory medium of claim 1, wherein said detecting the first participant comprises receiving user input from the first participant to check in to the first conferencing system.

3. The non-transitory, computer accessible memory medium of claim 1, wherein said detecting the first participant is performed automatically.

4. The non-transitory, computer accessible memory medium of claim 1, wherein said detecting the first participant is performed automatically and comprises automatically detecting a personal device of the first participant is in proximity to the first conferencing system.

5. The non-transitory, computer accessible memory medium of claim 1, wherein the program instructions are further executable to:
   determine a current time; and
   determine a scheduled time of the conference;
   wherein said automatically using the first conferencing system is performed if the difference between the current time and the scheduled time is below a first threshold of time.

6. The non-transitory, computer accessible memory medium of claim 1, wherein the program instructions are further executable to:
   provide a message to release the second conferencing system from the scheduled conference, wherein after releasing the second conferencing system, the second conferencing system is configured for use in another conference.

7. The non-transitory, computer accessible memory medium of claim 1, wherein the program instructions are further executable to:
   automatically customize the first conferencing system based on said detecting the first participant is in proximity to the first conferencing system.

8. A method for automatically using a first videoconferencing system instead of a videoconferencing conferencing system, comprising:
   detecting a first participant is in proximity to the first videoconferencing system;
   determining that a videoconference is scheduled for the first participant using the second videoconferencing system; and
   automatically using the first videoconferencing system instead of the second videoconferencing system for the videoconferencing based on detecting the first participant is in proximity to the first videoconferencing system and based on determining that the videoconference is scheduled for the first participant.

9. The method of claim 8, wherein said detecting the first participant comprises receiving user input from the first participant to check in to the first videoconferencing system.

10. The method of claim 8, wherein said detecting the first participant is performed automatically.

11. The method of claim 8, wherein said detecting the first participant is performed automatically and comprises automatically detecting a personal device of the first participant is in proximity to the first videoconferencing system.

12. The method of claim 8, further comprising:
   determining a current time; and
   determining a scheduled time of the videoconference;
   wherein said automatically using the first videoconferencing system is performed if the difference between the current time and the scheduled time is below a first threshold of time.

13. The method of claim 8, further comprising:
   providing a message to release the second videoconferencing system from the scheduled videoconference, wherein after releasing the second videoconferencing system, the second videoconferencing system is configured for use in another videoconference.

14. The method of claim 8, further comprising:
   automatically customizing the first videoconferencing system based on said detecting the first participant is in proximity to the first videoconferencing system.

15. A videoconferencing system, comprising:
   a videoconferencing unit at a participant location;
   at least one display coupled to the videoconferencing unit, wherein the at least one display is configured to provide video corresponding to other participant locations during a videoconference;
   at least one audio output coupled to the videoconferencing unit, wherein the at least one audio output is configured to provide audio corresponding to the other participant locations during the videoconference;
   at least one video input coupled to the videoconferencing unit, wherein the at least one video input is configured to capture video of the participant location for provision to the other participant locations;
   at least one audio input coupled to the videoconferencing unit, wherein the at least one audio input is configured to capture audio of the participant location for provision to the other participant locations;
   wherein the videoconference unit is configured to:
      detect a first participant is in proximity to the conferencing system;
      determine that a videoconference is scheduled for the first participant using a second videoconferencing system; and
      automatically use the videoconferencing system instead of the second videoconferencing system for the videoconference based on detecting the first participant is in proximity to the videoconferencing system and based on determining that the videoconference is scheduled for the first participant.

16. The videoconferencing system of claim 15, wherein said detecting the first participant comprises receiving user input from the first participant to check in to the videoconferencing system.

17. The videoconferencing system of claim 15, wherein said detecting the first participant is performed automatically.

18. The videoconferencing system of claim 15, wherein said detecting the first participant is performed automatically and comprises automatically detecting a personal device of the first participant is in proximity to the videoconferencing system.

19. The videoconferencing system of claim 15, wherein the videoconference unit is further configured to:
   determine a current time; and
   determine a scheduled time of the conference;
   wherein said automatically using the first videoconferencing system is performed if the difference between the current time and the scheduled time is below a first threshold of time.

20. The videoconferencing system of claim 15, wherein the videoconference unit is further configured to:
   provide a message to release the second videoconferencing system from the scheduled conference, wherein after releasing the second videoconferencing system, the second videoconferencing system is configured for use in another videoconference.

* * * * *